United States Patent
Schinner

[15] 3,638,229
[45] Jan. 25, 1972

| | | | | |
|---|---|---|---|---|
| 2,795,875 | 6/1957 | Nutter et al. | | 346/24 X |
| 3,051,953 | 8/1962 | Shepard | | 346/24 |
| 3,116,102 | 12/1963 | Kleimeyer | | 346/20 |
| 3,274,607 | 9/1966 | Muchow | | 346/24 |
| 3,034,123 | 5/1962 | Abbott et al. | | 346/24 |

[54] TIME-RECORDING APPARATUS

[72] Inventor: Thomas J. Schinner, Cincinnati, Ohio

[73] Assignee: The Cincinnati Time Recorder Company, Inc., Cincinnati, Ohio

[22] Filed: Feb. 5, 1970

[21] Appl. No.: 8,822

[52] U.S. Cl. ............................ 346/24, 235/61.9 R, 346/59, 346/88, 346/92
[51] Int. Cl. .................................................. G07c 1/30
[58] Field of Search ............... 346/20, 24, 53, 59, 82, 88, 346/90, 95, 104; 235/61.9 R; 194/DIG. 23

[56] References Cited

UNITED STATES PATENTS 2,259,677 10/1941 Abbott et al. ........................ 346/90

Primary Examiner—Joseph W. Hartary
Attorney—Wood, Herron & Evans

[57] ABSTRACT

A time-recording apparatus and system for automobile parking garages in which there is provided an "in" clock and "out" clock, the two clocks synchronized with one another to provide a printed ticket which indicates arrival time ("in" clock) and a record of the time of departure ("out" clock) with the parking rate and corresponding charge automatically printed on the ticket for payment to the cashier.

8 Claims, 9 Drawing Figures

INVENTOR.
BY Thomas J. Schinner
Wood, Herron & Evans
ATTORNEYS

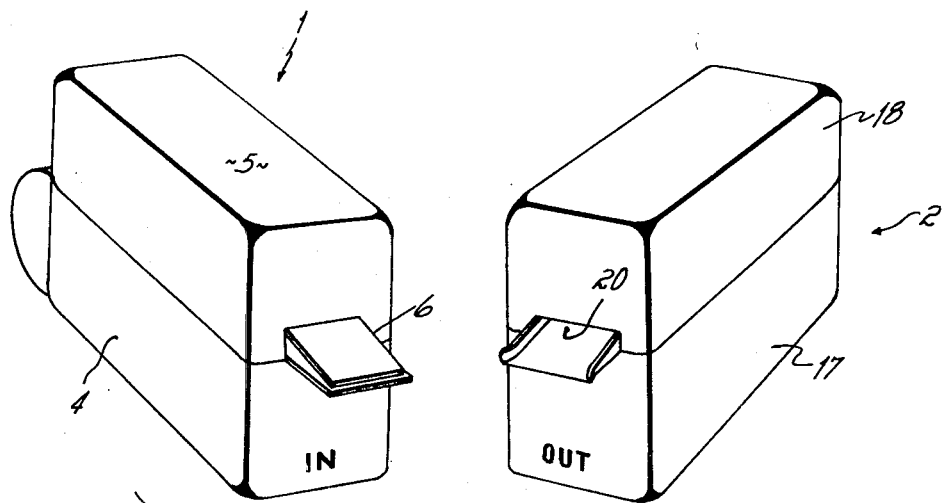
Fig. 4
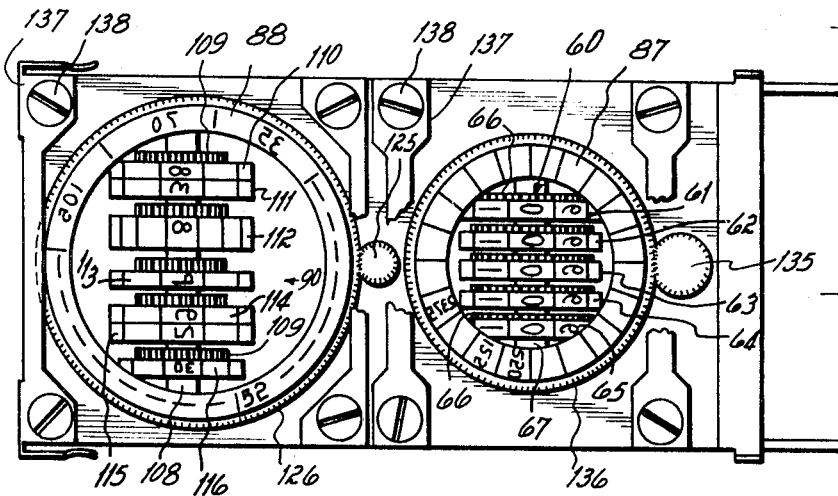
Fig. 5
Fig. 6
INVENTOR.
BY Thomas J. Schinner
Wood, Herron & Evans
ATTORNEYS

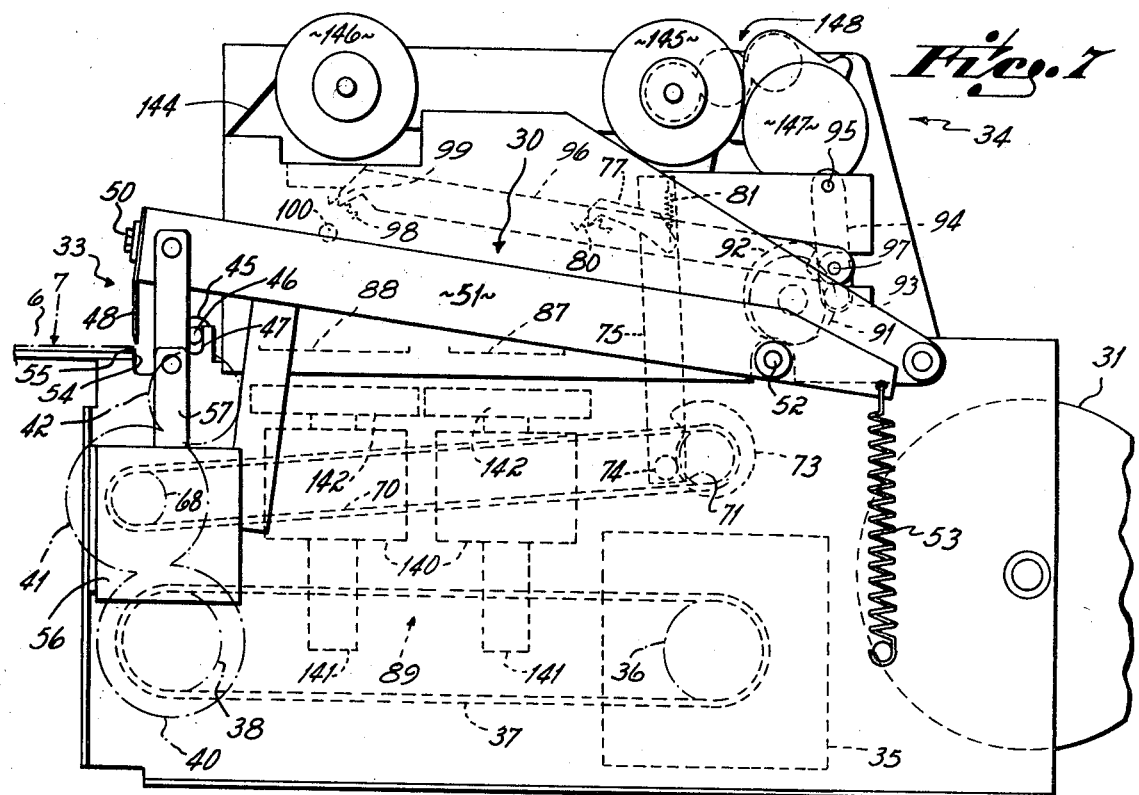

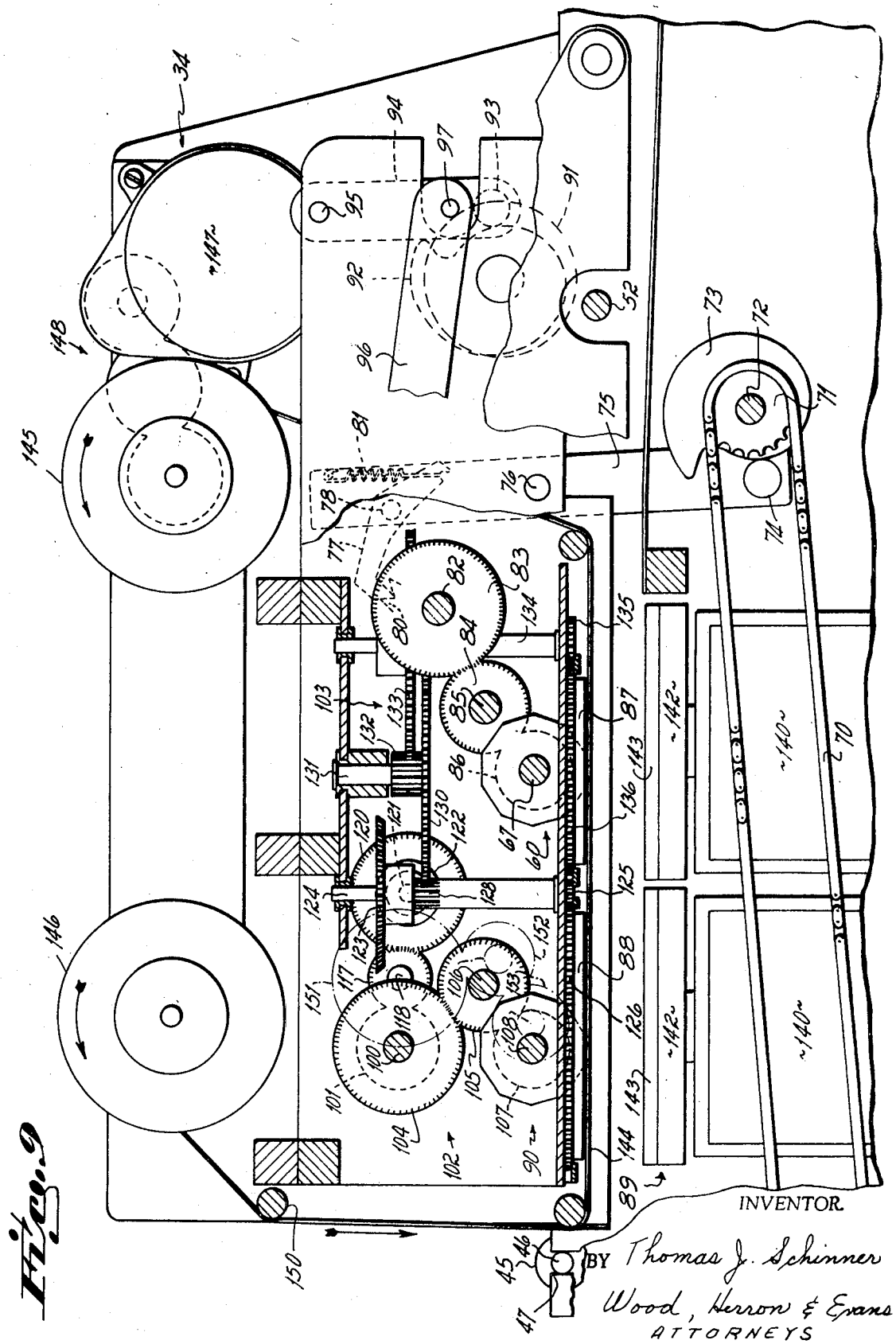

TIME-RECORDING APPARATUS

In practice, the IN clock, which includes a ticket feeder, dispenses to the driver upon arrival a parking ticket upon which there is printed two segmented circles, the first circle being calibrated to indicate the number of parking days and the rates and the second circle, spaced from the first, calibrated to indicate fractions of days or hours parked and the rates. The time-recording mechanism of the IN clock advances two rate-printing heads or rings at coordinated ratios, such that the fractional rate circle provides what may be called a vernier reading in fractions of a day of elapsed time.

When the driver leaves the parking area, the cashier inserts the printed parking ticket into the OUT clock or time recorder, which is similar to the IN clock, including two printing heads which are located to register with the rate circles previously printed upon the ticket. The OUT clock prints indicator marks which register with the calibrations of the daily rate circle and the fractional rate circle. The two printing heads of the OUT clock are advanced at the same coordinated rate as the printing heads of the IN clock. Thus, the time of arrival, so to speak, is stopped by the IN clock, while the OUT clock continues to advance so as to provide a record of the elapsed time when the card is stamped by the OUT clock. The parking fee is indicated on the daily rate circle and the indicator mark of the fractional circle shows by its position the fraction of a day so that the fee is clearly indicated by the vernier reading when the daily mark falls upon or near one of the daily calibration lines.

BACKGROUND OF THE INVENTION

Time-recording systems which provide a printed record of elapsed time have been in use for many years, for example, in connection with operating a storage garage or parking lot. A system of this nature usually involves the use of an IN clock which prints upon a parking ticket a record of the time of arrival of the car and the parking rate per hour, in combination with an OUT clock which stamps upon the ticket the amount of time elapsed and the parking charge.

A time recorder or clock system of this general type is disclosed in U.S. Pat. No. 3,116,192, issued to Vernon T. Kleimeyer on Dec. 31, 1963 and assigned to The Cincinnati Time Recorder Company. Generally speaking, the time recording system disclosed in the patent utilizes an IN clock and OUT clock, the IN clock printing upon a ticket the parking rates in the form of a segmented circle, and also the arrival time ("a.m." or "p.m."). The OUT clock, which advances in synchronism with the IN clock, is arranged to print within the rate circle a charge mark, which indicates directly the amount due for the elapsed parking time. The OUT clock also prints the time of departure ("a.m." or "p.m.").

In the event that the car has been parked for a period greater than 24 hours, the position of the charge mark with the calibration or segment of the rate circle will simply indicate how many hours have been parked and amount due, although several days may have elapsed. In order to take care of this contingency, the additional time can be ascertained by computing it from the arrival and departure times indicated. Thus, the amount paid to the cashier would be the charge indicated by the hourly marker plus the additional charge computed from the arrival and departure time indication.

One of the primary objectives of the invention has been to provide a time-recording apparatus for recording elapsed time in connection with parking areas in which the car may be parked or stored for several days or weeks, as distinguished from daily parking.

According to this concept, the apparatus utilizes clocks or time recorders which print upon the parking ticket two segmented time circles, one of the circles indicating the parking rate and charge in days and the second constituting a vernier circle indicating the rate and charge in fractions of a day or in hours, thus showing clearly and accurately the elapsed time in days and fractions and the fee due.

More specifically, the time-recording apparatus involves the use of an IN clock and OUT clock arranged to record the elapsed time in a direct manner, the IN clock being provided with printing heads which print, in circular form a segmented daily rate circle showing the number of days parked and the rate by graduations or calibration lines. The fractional or hourly rate circle similarly is provided with graduations showing the rate for storage time in fractions of a day. The direct reading of the parking charge is determined by the orientation of the charge indications which are printed by the OUT clock in the daily rate circle and in the fractional rate circle, thus simplifying the computation of the cost of parking when the ticket is presented for payment.

According to this aspect of the invention, both the IN and OUT clock are synchronized, that is, both clocks advance at the same rate. Accordingly, when the parking ticket is impressed by the IN clock to show the day and hour of arrival, the time is fixed, and the driver retains the card. Upon leaving the parking area several days later, the driver presents the marked ticket to the cashier who inserts the ticket into the OUT clock, which includes the charge indicators for the number of elapsed days and hours. Thus, the day indicator shows directly, by the orientation of the daily charge indicator the charge for the days parked, and the hourly indicator, by virtue of its vernier advancement, indicates the fraction of a day. More precisely, the hourly rate circle and orientation of its indicator mark shows accurately the number of elapsed days even though the daily charge marker falls upon or very close to one of the day calibrations. Thus, the entire total can be read directly from the parking ticket without requiring any computation and without any question as to the fee due.

To illustrate further, if the driver were to take the ticket dispensed by the IN clock and immediately insert it into the OUT clock, the charge indications would show a reading of zero since no time has elapsed. If the car has been parked for a matter of hours less than a day, then the orientation of the hour or fractional charge indicator printed by the OUT clock, in relation to the calibration of the hourly rate circle, would indicate the charge for the number of hours. In the event that the car is parked for several days, then the number of days is indicated by the orientation of the daily rate indicator with respect to the calibrations of the daily rate circle.

By way of example, with a rate schedule of $1.25 per day a car may have been parked for a period in which the daily charge indication mark may lie on the radial calibration between the $7.50 and $8.75 segments, making it difficult to determine the exact parking fee due. However, the correct charge for the parking period is clearly indicated by the orientation of the hourly or fractional charge indicator with respect to the zero line of the hourly rate schedule. Thus, if the hourly indicator mark lies to the upstream side of the zero calibration of the hourly rate schedule circle, the hourly charge indicator by its vernier action will indicate that the charge should be $7.50. On the other hand, if the charge indication of the hourly charge marker lies on the downstream side of the zero marker, then the parking charge would amount to $8.75. The apparatus thus eliminates any question about the actual fee to be paid.

According to the present example, the graduated circle representing the daily rate schedule is calibrated to provide 20 segments each representing one day. The driving mechanism of the IN clock rotates the daily rate circle one segment, as divided by the radial calibration lines, during a 24 hour period. During the same 24 hours, the circular hourly rate schedule is advanced one complete revolution, thereby providing the vernier reading. In the present example therefore, the ratio of the hour and daily rate schedules amounts to 20 to one. The OUT clock advances the charge indicators at the same ratio, thus providing direct reading of the parking fee.

In the example disclosed, the IN clock includes a ticket feed mechanism, the rate circles being printed in response to a signal generated by the incoming car. The ticket feed mechanism then advances the printed ticket from a reel, then severs it for presentation to the driver.

The IN and OUT clocks also include date counters which indicate on the ticket the date of arrival and departure. In case the car has been parked for a period greater than 20 days which is the limit of the daily rate and charge indication, then the additional fee can be computed from the dates shown.

The features and advantages of the invention are brought out in greater detail in the following specification in conjunction with the drawings.

DRAWINGS

FIG. 4 illustrates in perspective, a preferred form of the IN and OUT clocks which include the time recording and printing mechanism of invention.

FIG. 5 is a plan view illustrating the printing heads of the IN clock which print upon the ticket the daily and hourly rate circles as the vehicle enters the parking area dna corresponding to the ticket shown in FIG. 1.

FIG. 6 is a plan view, similar to FIG. 5, showing the printing heads of the OUT clock which print upon the ticket the price indications and the departure time as shown in FIG. 2.

FIG. 7 is a simplified side elevation of the IN clock showing the various operating components.

FIG. 8 is a side view generally similar to FIG. 7, showing the several operating components of the OUT clock.

FIG. 9 is a general side elevation partially in cross section, illustrating the recording mechanism for the IN and OUT clock, both clocks being similar, with minor changes adapting them to their respective IN and OUT ticket printing operations.

RECORDER SYSTEM IN GENERAL

According to the system selected to best illustrate the principles of the invention, there is provided two time clocks or recorders (FIG. 4), the IN clock being generally illustrated at 1 and the OUT clock being indicated at 2. The IN clock and recorder mechanism is mounted within a sectional housing consisting of a lower section 4 and an upper section 5 which completes the enclosure. The forward end of the IN clock includes a ticket-dispensing chute 6 which issues a time-card or ticket 7 (FIG. 1) for each vehicle as it enters the garage or parking area. The ticket is retained by the driver after the car is parked.

Figure 1:
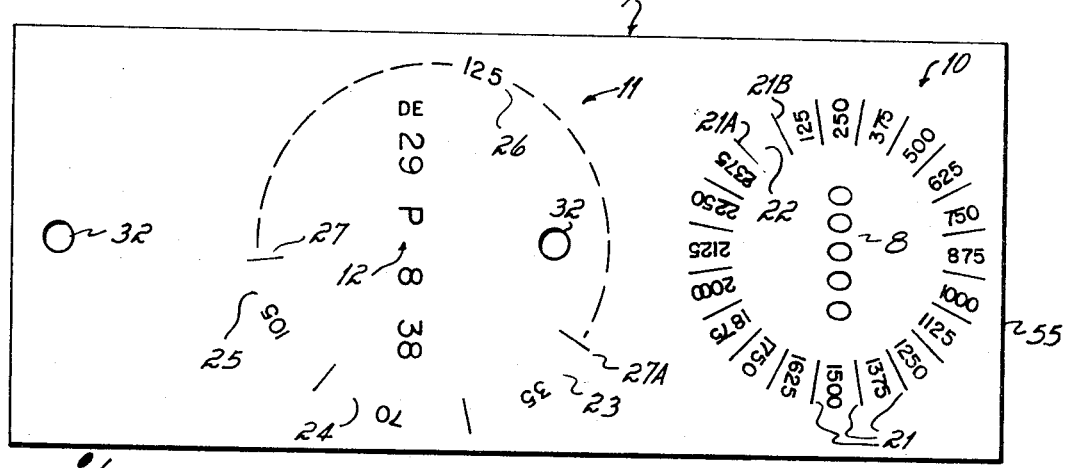
FIG. 1 is a face view of a time ticket after having been dispensed by the IN clock and having printed thereon the rate circles and also the date and time the car entered the parking area.

In the ticket example illustrated in FIG. 1, the IN clock 1 includes time recorder and printing mechanism which impresses upon the ticket, before it is issued to the driver, a ticket number indicated at 8, a daily rate calibration circle 10, an hourly rate calibration circle 11, and the date and time of arrival, as indicated at 12.

When the car subsequently is driven from the garage or parking area, the cashier inserts the card 7 into the OUT clock or recorder 2. As explained later in detail, the OUT clock overprints the daily and hourly rate calibration circles 10 and 11 to indicate exactly the elapsed parking time and the amount owed.

Figure 2:
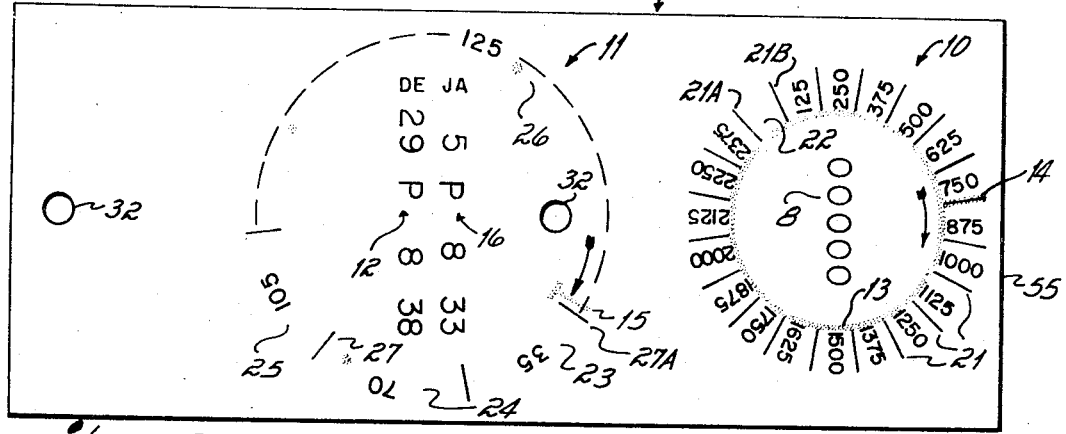
FIG. 2 is a view similar to FIG. 1 of the same ticket after insertion into the OUT clock and having printed thereon the charge indicator marks which coincide with the price indications of the charge circles and also showing the date and time of departure of the car from the parking area.

Thus, as indicated in FIG. 2, the OUT clock prints upon the daily rate circle 10 a charge circle 13 which includes a radial indicator line 14. The OUT clock also prints within the hourly rate circle 11 a radial indicator line 15, which indicates the fraction of an hour of elapsed time. The OUT time indicated by the daily charge indicator 14 and hourly charge indicator 15, preferably are of contrasting colors to the rate circles 10 and 11 so as to make the card more easily readable.

In addition to the daily charge indicator 14 and the hourly charge indicator 15, the OUT recorder or clock also prints the date and time of departure 16 within the hourly charge circle 11 in alignment with and spaced inwardly from the arrival time and date 12. This indicia is also preferably printed in a contras,ing color.

The OUT clock 2 which imprints the departure indicia upon the parking ticket (FIGS. 2 and 3) is similar in construction to the IN clock as described later. In general, the OUT clock or recorder includes a lower section 17 and an upper section 18, similar to the IN clock and the forward end of the OUT clock includes a ticket guide 20 into which the card or ticket is inserted by an attendant or cashier when the driver leaves the parking area. Upon insertion of the ticket, the OUT clock prints the departure indicia, described above, and the cashier can visually read the monetary amount due for the driver's parking privileges.

Generally speaking, the IN clock is operated in an automatic manner upon the approach of the vehicle by well-known means, such as a photoelectric system having a light beam which is interrupted by the vehicle or by a treadle or the like. The IN clock, in addition to the recording and printing mechanism for showing the time and date arrival (described above) further includes a ticket feed mechanism. The operation of the recording and printing mechanism is initiated upon receiving a signal by the photocell system; thereafter, the ticket is fed forwardly and severed from a reel. The severed ticket is presented at the ticket chute 6 (FIG. 4) to be picked up by the driver, as noted.

Figure 3:
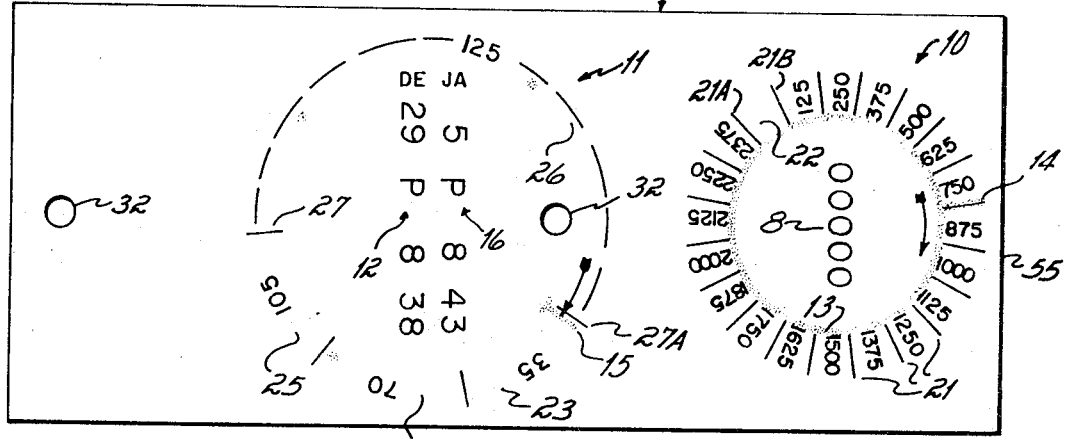
FIG. 3 is a view similar to FIG. 2 but showing a departure time a few minutes later than the time indicated on the ticket shown in FIG. 2, to illustrate the principles of the invention.

In the example illustrated in FIGS. 1, 2 and 3, the daily rate calibration circle 10 comprises 20 segments which are delineated by the radial calibration lines 21. The daily rate circle 10 starts with a zero or unmarked segment 22 delineated by the radial calibration lines 21A and 21B and indicating that a parking fee should be read in the hourly rate circle 11 which is for the fractions of a day. Radial line 21A represents zero and radial line 21B represents one full day. When the mark 14 is printed within the unmarked sector 22, the attendant should refer to the date imprints 12 and 16 to determine if the parking patron is in his first day or is in fact leaving on his twentieth day of parking.

In the present system, the parking rate amounts to $1.25 per day as indicated by the several sectors, such that the charge for parking 20 days would amount to $25.00. In this event, the radial indicator mark 14 of time charge circle 13 will have advanced through one complete circle, which would place it in the unmarked segment 22.

It will be understood that if the car is parked for only a fraction of a day, then the radial mark 14 will indicate approximately the fractional amount of the day which will be somewhere on the 1.25 segment. As previously stated, the cashier will have to refer to the hourly rate circle 11 and the indicator 15 to determine the exact number of hours and the rate to be charged for the fractional day.

According to the schedule of charges for which the apparatus is set up, rate for the first hour parking time is 35¢ indicated by the sector 23 of the hourly circle, the second hour charge would be 70¢ indicated by the sector 24 and the charge for the third hour would be $1.05 as indicated by the sector 25. The hourly segments are delineated by the radial calibration lines 27, the zero or 24 hour setting being indicated by the calibration line 27A.

According to the present rate schedule, the parking time beyond the $1.05 segment 25 is indicated by the segment 26 which extends through an arc greater than 180°. The charge for the parking time beyond the third hour ($1.05) thus amounts to $1.25 up to 24 hours. When the hour rate indicator 15 reaches the radial calibration line 27A, the daily charge indicator 14 will have moved from the radial line 21A of the daily rate circle 10 onto the radial line 21B. Each of the radial lines 21 of the daily rate circle 10 divide or separate the charge increments, such that alignment of the indicator line 14 will equal the amount to be charged. During the first day when the mark 14 is aligned with the $1.25 indicia of the daily rate circle 10, the charge of $1.25 will correspond with the charge indicated by the alignment of indicator line 15 with the $1.25 calibration of the hourly rate circle 11.

As noted earlier, the daily rate schedule in combination with the hourly rate calibration (circles 10 and 11) provide an accurate indication of the charge to be paid by the customer, even though the daily indicator line 14 falls at or near a radial calibration line 21 of the daily charge circle. By way of example, as shown in FIG. 2, the daily charge indicator 14 falls almost directly upon the calibration line 21, which would indicate a charge of either $$7.50 or $8.75. By glancing at the hourly rate circle 11 and the position of the hourly charge indicator 15, it will be seen that the elapsed time is slightly less than indicated by the 24-hour or zero calibration line 27A, indicating that the current 24-hour period has not elapsed and that the charge would amount to $7.50.

However, with the mark 14 in a position as stated above, i.e., between $7.50 and $8.75 and the hourly charge indicator 15 moved to a point beyond the 24 -hour or zero calibration line 27A, as shown in FIG. 3, the charge would amount to $8.75. In other words, if the mark 14 is imprinted on a radial line 21 an attendant or cashier must refer to the position of the mark 15 with respect to the 24-hour calibration line 27A to determine which charge is to be read from the ticket.

Generally speaking, the daily rate circle 10 and hourly rate circle 11 (FIG. 1) are printed by respective marker rings driven at a constant rate by a synchronous motor through the gear trains of the time-recording mechanism of the IN-clock 1. It will be understood that the printing ring for the hourly rate circle 11 makes one complete revolution every 24 hours and that the ring for printing the daily rate circle 10 is rotated at the rate of 20 to one with respect to the hourly ring. Accordingly, the daily rate ring 10 is advanced 1/20 or one segment for each complete revolution of the hourly charge ring 11 (FIG. 1).

The charge-marking rings which print the daily charge circle 13 and its indicator line 14 and the hourly charge indicator line 15 are similarly advanced by a synchronous motor driving the recorder mechanism of the OUT-clock 2. Accordingly, if the card is printed by the IN clock to indicate the rate circles (FIG. 1) and is immediately placed in the OUT clock to indicate the charge, then the charge indicator lines 14 and 15 would be in positions corresponding with the zero positions of the rate indicator circles 10 and 11 would indicate no charge.

On the other hand, any time elapsed after the rate calibration circles are impressed by the IN clock will be indicated since the charge indicator lines 14 and 15 continue to advance relative to the previously imprinted rate circles 10 and 11. Thus the amount of advancement during the elapsed time will be registered upon the rate circles (FIGS. 2 and 3) to show the charge to be made, as explained above.

If the elapsed time amounts to 20 days or more, which is the limit of the daily charge circle 10, then the additional elapsed time will be apparent from the difference between the IN date and time 12 and the OUT date and time 16, and will have to be calculated by the attendant or cashier.

IN TIME CLOCK COMPONENTS

Both the IN and OUT time recorders or clocks are similar in that both are provided with time rings for printing a record upon the ticket 7, as noted above. Thus, the IN-clock 1 includes the two time rings for printing the daily rate circle 10 and the hourly rate circle 11, together with the date of arrival 12, and the ticket number 8. The OUT clock similarly is provided with the two time rings for printing the indicator 14 marks and 15 showing the elapsed time on the daily charge circle 10 and hourly charge circle 11, and also the time and date of departure 16.

Since the elapsed time data of the OUT time recorder is overprinted on the two circles 10 and 11, the two pairs of time rings are in the same relative location and the mechanism for advancing the rings and for printing the recorded information may be identical for both clocks, as disclosed herein.

As noted earlier, the IN clock is arranged to dispense automatically, in response to a signal, the severed parking ticket showing the date and hour of arrival. This ticket is retained by the driver to show the elapsed time when the ticket is inserted into the OUT clock. Accordingly, the IN clock shown diagrammatically in FIG. 7 is similar to the OUT clock shown in FIG. 8, with minor exceptions. The clock structure of FIG. 9 illustrates in a simplified manner the time recorder mechanism for both clocks and includes, in part, a portion of the ticket feed mechanism which forms a part of the IN clock.

Described briefly, the ticket feed mechanism of the IN clock is indicated generally at 30 (FIGS. 7 and 9) and includes a ticket reel 31 which consists of a continuous ticket strip in roll formation and having spaced feed apertures 32 (FIGS. 1–3). The ticket feed mechanism also includes a cutoff device 33 (FIG. 7) which severs the ticket 7, with an end portion protruding from the chute 6 (FIG. 4) whereby the printed ticket is delivered to the driver of the incoming car. The IN-clock 1 further includes a ribbon feed mechanism, indicated generally at 34, which advances the ribbon with respect to the printing rings, as explained later. It is to be noted that the OUT clock includes a similar ribbon feed mechanism 34 as indicated in FIG. 8.

TICKET FEED MECHANISM (IN CLOCK)

The ticket feed mechanism 30 essentially comprises a ticket feed motor 35 (FIG. 7) having a drive sprocket 36 engaging a sprocket chain 37. Chain 37 meshes with a driven sprocket 38 mounted on a shaft (not shown) which includes a gear 40. The gear 40 drives an idler gear 41 meshing with a gear 42. Gear 42 is mounted upon a shaft (not shown) which includes a ticket feed disc (not shown).

This disc includes a normally upstanding finger (not shown) which passes through the apertures 32 of the ticket strip issuing from ticket reel 31. The ticket feed disc cooperates with an idler roller 45 (FIGS. 7 and 9) mounted on a shaft 46 which is engaged at opposite ends in slots 47 formed in the lower section 4 of the IN clock. The idler roller 45 engages the surface of the ticket strip and holds the strip in contact with the feed disc as the ticket 7 is dispensed by way of chute 6 (FIG. 4).

In the present example, the ticket feed motor 35 may be energized through a control circuit upon receiving a signal from the detecting apparatus (not shown), such as the photocell apparatus, previously noted, which detects the approach of an incoming car. The feed mechanism includes suitable means for deenergizing the motor 35 after one cycle of operation. It will be understood that the IN time rings for printing the daily time circle 10, the hourly time circle 11 and the date 12 are advanced constantly and that the printing mechanism, as described later, impresses this information upon the ticket prior to the operation of the ticket feed mechanism.

After the ticket is printed and advanced to the chute 6 of the IN clock, the ticket cutoff mechanism, previously indicated at 33 (FIG. 7) is energized to sever the ticket. This mechanism comprises a shearing blade 48 secured as at 50 to the free end of a cutoff lever 51 (FIG. 7). The rearward portion of lever 51 is pivotally supported upon a cross-shaft 52 carried by the lower casing section 4. The shearing lever 51 is normally biased in the elevated position shown, by a tension spring 53 having one end anchored to the end of the bar 51 which extends beyond its pivot shaft 52, the lower end of spring 53 being anchored to the casing 4. By virtue of this arrangement, the cutting or shearing blade 48 is normally in its elevated position above the shearing edge 54 of delivery chute 6.

At the end of the ticket printing and feeding cycle, the cutoff blade 48 is shifted downwardly so as to shear the trailing edge 55 (FIGS. 1–3) of the ticket from the strip. In the present example, the shearing operation is carried out by a solenoid 56 (FIG. 7) having an armature 57 connected to the swinging end of lever 51 adjacent the cutoff or shearing blade 48. The solenoid 56 is energized at the end of this cycle by a suitable switch (not shown) which forms a part of the control circuit of the feeding mechanism.

TICKET-COUNTING MECHANISM (IN CLOCK)

The ticket feed mechanism, previously indicated at 30 and driven by motor 35 (FIG. 7) includes the mechanism for printing the ticket number 8 (FIGS. 1-3) as a consequence of the operation of the ticket feeding mechanism. The ticket counter, indicated generally at 60 (FIG. 5) is of conventional design, and therefore is not disclosed in detail. In the form selected for illustration (FIG. 5), the counter 60 consists of five printing wheels, each having raised type for printing zeros, as shown, and the digits from 1 to 9.

The five wheels of counter 60 are indicated at 61 through 65, the wheel 61 printing the units, the wheel 62 in combination with wheel 61 printing the tens, the wheels 63, 64 and 65 printing the remaining numbers, each wheel operating in increments of 0 to 9 per revolution. Each of the wheels 61 through 65 includes a gear 66, the wheels and gears being mounted upon a shaft 67.

Each wheel is provided with a conventional transfer mechanism (not shown) for advancing the wheels in sequence after each complete revolution. Thus after the unit wheel 61 makes one complete revolution from "o" to "9" the transfer mechanism will advance the tens wheel 62 one step. In a similar manner after the tens wheel 62 is advanced one complete revolution, the transfer mechanism will advance the next wheel 63 one step. The remaining wheels 64 and 65 are advanced in stepwise increments in the same manner to indicate the total number of parking tickets issued by the feed mechanism.

For advancing the ticket counter 60, the idler gear 41 which drives the feed disc also drives gear 42, includes a sprocket 68 (FIG. 7) in driving connection with a sprocket chain 70 which meshes with a second sprocket 71. Sprocket 71 is mounted upon a shaft 72 (FIG. 9) which includes a cam 73 for advancing the counter 60 in stepwise increments. For this purpose, cam 73 includes a follower 74 mounted upon the lower end portion of a cam lever 75 (FIG. 9) which is pivotally supported as at 76.

The upper end portion of cam lever 75 includes a pawl 77 pivotally connected to the cam lever as at 78 (FIGS. 7 and 9). The outer end of pawl 77 engages the teeth of a ratchet wheel 80 mounted upon a shaft 82. The free end of pawl 77 is biased toward the ratchet wheel 80 by a tension spring 81 anchored to the tailpiece of the pawl 77 and to the cam lever 75 so as to advance the ratchet wheel 80 in step-by-step increments, one increment upon each complete revolution of cam 73.

The ratchet wheel 80 (FIG. 9) is mounted upon a cross-shaft 82 which includes a driving gear 83 meshing with an idler gear 84 mounted upon shaft 85. Idler gear 84 meshes with a driven gear 86 carried on the shaft 67 of counter 60. The gear 86 may be in driving connection with the unit wheel 61 of counter 60, such that the series of five wheels are sequentially rotated in step-by-step increments in response to rotation of the gear 84. It will be understood at this point, that the wheel 61 is advanced one step or increment for each ticket-feeding cycle in response to the single rotation of cam 73 during the feeding cycle.

TIME RECORDING AND PRINTING (IN CLOCK)

As noted, the daily charge rate circle 10, the hourly charge rate circle 11 and the date and time of arrival 12 are printed on the ticket at the same time the ticket number 8 is printed. Generally speaking, the calibrated daily rate circle 10 is printed by the annular marker ring 87 (FIG. 5) and the calibrated hourly rate circle 11 is printed by the annular marker ring 88.

The date and time of arrival, previously indicated at 12 (FIG. 1) are printed by a date and time counter indicated generally at 90 which is located within the hourly marker ring 88 (FIG. 5).

The indicia indicated by the two marker rings 87 and 88 and the counters 60 and 90 are impressed upon the ticket 7 by the two solenoid-operated printing devices 89 which include individual platens for impressing the ticket against the typeface which is exposed by the two rings and counters (FIG. 5). It will be understood that the rings 87 and 88, and the counters 60 and 90 each have raised type, whereby the indicia which is exposed may be impressed upon the card by the application of pressure against the ticket by the platen of the printing devices 89.

As shown in simplified form in FIG. 7, the marker rings 87 and 88 and the counter 90 are advanced at the proper rates per day by a synchronous motor 91 (FIGS. 7 and 9) which drives a cam 92 for advancing the timing mechanism in stepwise increments. For this purpose, there is provided a cam follower 93 engaging the periphery of the cam 92 and journaled upon the lower end of a cam lever 94. The upper end of lever 94 is pivotally connected as at 95 to the casing of the clock and an elongated pawl arm 96 is pivotally connected as at 97 to the lower portion of cam lever 94 adjacent the follower 93. The forward end of the ratchet lever 96 includes a pawl 99 engaging the teeth of a ratchet wheel 98 (FIG. 7).

Ratchet wheel 98 is secured to a cross-shaft 100 (FIG. 9) which carries a driving gear 101, such that gear 101 is rotated in stepwise increments by the operation of motor 91 and the reciprocation of the pawl 99. Gear 101 drives a gear train, as explained later, which rotates the daily marker ring 87, the hourly marker ring 88 and the date counter 90 at the proper rates of advancement (FIG. 9).

It will be understood that the gear train which advances the daily marker ring 87, the hour marker ring 88 and the date counter 90 are all driven by the motor 91 and ratchet wheel 98. Thus, as shown in FIG. 9, the gear train which is indicated generally at 102, advances the hourly marker ring 88 and the date counter 90 (FIG. 5).

The gear grain 102 is interconnected by suitable gears with a second gear train, indicated generally at 103, which advances the daily marker ring 87.

It will be recalled that the counter 60 (FIG. 5) which imprints the ticket number is driven independently of the timer motor 91, by its own motor 35 (FIG. 7) which is energized each time a ticket is issued without regard to the time of issuance.

As shown in simplified form in FIG. 9, the gear train for the date counter 90 comprises the gear 104 of shaft 100 meshing with a gear 105 on shaft 106. Gear 105 meshes with a gear 107 of the shaft 108 on which the date counter 90 is mounted. The date counter 90 is similar in principle to the ticket counter 60 and comprises wheels 110 through 116 (FIG. 5) for printing the time and date of arrival as shown in FIG. 1. The wheels 110–116 are mounted upon the shaft 108 and the wheels 110–116 include individual gears 109 for rotating the wheels. The gears 109 are provided with transfer mechanism, as disclosed earlier with reference to the ticket counter 60 for advancing the wheels in proper sequence. The time and date wheels 110, 111, 112, 114 and 115 include raised typefaces for printing zeros and the digits 1–9.

The wheel 113 imprints an "A" or "P" indicating "a.m." or "p.m.," the wheels 110-112 print the time. The wheels 114 and 115 print the date and the wheel 116 prints the month. Thus, in the setting shown in FIG. 1, the several wheels are rotated in proper sequence to print the date of arrival as "DE 29 P8 38" indicating arrival time of 8:38 p.m. on Dec. 29. The mechanical transfer mechanism is for imparting the necessary rates of revolution to the several wheels is well known in the art and therefore is not described in detail.

The gear train for rotating the hourly calibrated marker ring 88 comprises the ratchet wheel 98 of shaft 100 and gear 101 (previously described) as shown in FIGS. 7 and 9. Gear 101 drives a gear 117 of shaft 118 meshing with a gear 120 (FIG. 9) of shaft 121. Shaft 121 includes a small bevel gear 122, meshing with a large bevel gear 123 mounted upon the vertical shaft 124. The lower end of the vertical shaft 124 includes a pinion 125 (FIG. 9) meshing with a ring gear 126 forming part of the hourly marker ring 88 for rotating the ring at the proper rate.

The drive for the daily marker ring 87 (FIG. 9) is by way of a pinion 128 formed on vertical shaft 124 and meshing with a large gear 130 of vertical shaft 131. Shaft 131 includes a pinion 132 meshing with a large gear 133 of vertical shaft 134. The lower end of vertical shaft 134 includes a pinion 135 meshing with the ring gear 136 of the daily marker ring 87 for rotating the ring at the proper rate.

In the present example, the gear trains 102 and 103 rotate the hourly marker ring 88 and daily marker ring 87 at a ratio of 20 to 1. Thus, the hourly marker ring makes one complete revolution each day to indicate the total charge of $1.25 which has been selected as the rate in this example. During one revolution of the hourly marker ring 88, the daily marker ring 87 is thus advanced one radial segment, there being provided 20 segments, as indicated earlier. The daily rate ring 87 thus indicates the parking charge for 20 days parking while the hourly ring 88 indicates the fraction of the day by operation of the hourly indicator mark 15 as previously described.

In the event that the car has remained in the storage for more than 20 days, then the cashier must charge by simple arithmetic, utilizing the arrival date 12 (FIG. 1) and departure date 16 to determine the number of days and then multiplies by the daily charge rate as explained earlier.

As shown in FIGS. 5 and 9, the daily rate marker ring 87 and hourly rate marker ring 88 are held in place by respective pairs of retainer straps 137—137. The straps are held in sliding contact with the ring gears of the marker rings and are secured to the timer housing by respective pairs of screws 138—138. This arrangement permits the rate marker rings to be replaced in a very simple manner in the event that the charge rates are to be altered.

PRINTING MECHANISM (IN CLOCK)

The printing mechanism, previously indicated at 89 is of conventional design, consisting essentially of the two solenoids 140—140 (FIGS. 7 and 9), each solenoid 140 having an armature 141 which shifts upwardly when the solenoid winding is energized. The two solenoids are mounted in alignment with the daily rate marker ring 87 and the hourly marker ring 88 and the upper end of each solenoid armature includes a platen 142. The upper surface of the platen 142 includes a printing pad 143 which may be formed of rubber or other resilient material.

A printing ribbon 144 (FIG. 9) fed by the ribbon feed mechanism 34, passes across the printing faces of the rings 86 and 87 and the printing wheels of the counters 60 and 90. The ticket strip which subsequently forms a ticket 7 is fed immediately below the ribbon 144, such that the raised type of the printing elements is impressed upon the ticket through the ribbon when the platens 142 and pads 143 are raised upon energization of the solenoids 140—140.

As noted earlier, the solenoids 140 are energized simultaneously by means of a switch (not shown) forming a part of the control circuit. The control circuit causes the solenoids 140 to be energized before the ticket strip is advanced and severed, so that when the ticket strip is advanced and severed, it carries the printed indicia upon the upper exposed face of the ticket. The severed ticket 7, as indicated in broken lines in FIG. 7, is dispensed at the delivery chute 6 of the IN clock to be removed by the driver.

The ribbon feed mechanism 34, which forms a part of the printing apparatus 89 is also conventional, consisting of the two reels 145 and 146 (FIG. 9) mounted for rotation in the upper portion of the upper housing 5 of the IN clock. The ribbon feed includes a motor 147 in driving connection by means of the gear train 148 with the takeup reel 145 and driving it intermittently in the direction indicated by the arrow. The ribbon 144 is guided in its path between the reels 145 and 146 by suitable rollers 150 and is payed out from the reel 146, when the takeup reel 145 is energized. The motor 147 of the ribbon feed mechanism is an exceedingly low-speed motor and since it is energized intermittently by switches (not shown) interconnected in the control system and operable to advance the ribbon only when a ticket is dispensed. The extremely long ribbon does not need a reversing or rewind mechanism.

OUT CLOCK

The time-recording mechanism of the OUT-clock 2 is identical to that of the IN clock except that the counter 90 for the departure date, previously indicated at 16 is located inwardly so as to print the departure date adjacent the arrival date 12, as shown in FIGS. 2 and 3. Since the gear trains are the same, both the IN and the OUT time-recording mechanism is shown in FIG. 9.

Both clocks are driven by a synchronous motor 91 reciprocating the ratchet arm 96 which includes the pawl 99 for advancing the ratchet wheel 98 (FIG. 7) of shaft 100. In order to space the departure date counter 90 inwardly, the shaft 118 includes a gear 151, shown in broken lines in FIG. 9. Gear 151 meshes with a gear 152 mounted upon a shaft 106, corresponding to shaft 106 of the IN clock, as indicated by the broken lines. Gear 152 meshes with a gear 153 shown in broken lines, which corresponds to the gear 107 of the IN clock, the gear 153 being mounted upon the shaft 108 of the counter 90, which, as above noted, is spaced inwardly to properly locate the departure time 16.

The counting wheels of the departure counter 154 (FIG. 6) are identical to those of the arrival counter, and include the same set of gears and transfer mechanism for sequentially advancing the wheels one after the other to impress the correct date of departure. Thus as shown in FIGS. 2 and 6, the wheels 110, 111 and 112 print the time of departure, the wheel 113 prints the "P" representing "p.m." The wheel 114 imprints the day of departure, and the wheel 116 prints the month of departure, as "JA" representing Jan. 5th.

The gear train 102 is otherwise identical to that of the IN clock including a vertical shaft 124 having a pinion 125 (FIG. 6) meshing with a ring gear 127. Ring gear 127 is attached to the charge marker ring 155 which includes an embossed radial line 156 and three equally spaced lugs 166. Line 156 prints the hourly charge indicator 15, previously described and the lugs 166 provide an even four-point contact upon the card 7. Without the lugs 166, the marker 156 and a portion of the ring 155 would be imprinted upon the ticket. It will be understood at this point that the charge indicator ring 155 (FIG. 6) advances at the same rate as the hourly ring 88 (FIG. 5), the gear trains being identical, so that the charge indicator mark 156 will show the time elapsed after the hourly rate calibrated circle has been printed.

The daily charge marker ring 157 is identical to the daily rate marker ring 87, previously described, and is driven by a gear train 103, identical to that shown in FIG. 9. The charge marker ring 157 is advanced by the pinion 135 which meshes with the ring gear 59 which is attached to charge marker ring 157. The charge marker ring includes a raised circle 158 including a radial line 160 for printing the daily charge circle 13 and the radial charge indicator line 14 (FIGS. 2 and 6).

The rings 155 and 157 are held in place by retainer straps 137 having screws 138, permitting the rings and their gears to be interchanged if necessary. It will be noted that the ticket counter 60 is omitted from the charge ring 158 of the OUT clock since this information has already been printed by the IN clock.

As explained above, the severed ticket is inserted by the cashier into the chute 20 of the OUT clock to indicate the time of departure. Upon being inserted, the leading edge 55 of the ticket contacts the trip lever 161 which is disposed in the path of the ticket adjacent the marker ring (FIG. 8). Upon being tripped, lever 161 swings about its pivot point 162 in the rearward direction and thereby shifts a link 163 rearwardly. Link 163 is connected to the switch arm 164 of normally open switch contacts 165 to close a circuit. Upon being closed, the contacts 165 complete a control circuit (not shown) which initiates the printing operation.

The printing mechanism is identical to that disclosed with respect to the IN clock and comprises the solenoids 140 having armatures 141. The armatures include platens 142 at their upper ends which press the ticket against the printing elements of the counter 154, charge ring 155 and charge ring 157 to carry out the printing action after the cycle has been initiated by the closing of contacts 165 of the control circuit.

The OUT clock includes the same ribbon feed mechanism previously indicated at 34. The motor 147 of the ribbon feed mechanism 34 is energized by the control circuit in time with the operation of the printing solenoids 140 by the control circuit in response to closing of the switch contacts 165.

OPERATION

Briefly, from the foregoing, it will be understood that the operation of the IN clock (FIG. 7) is initiated in response to a signal from the detecting apparatus upon arrival of the car at the entrance of the parking area. Upon being initiated, the printing apparatus (solenoids 140—140) impress upon the ticket strip the daily rate circle 10 (daily marker ring 87) and the hourly rate circle 11 (hourly rate marker ring 87) as shown in FIGS. 1 and 5, at this time, the ticket counter 60 also impresses the ticket number indicated at 8 in FIG. 1 and the time and date counter 90 impresses the ticket with the time and date 12. The strip is then advanced from the reel 31 severed by the cutoff blade 48 of ticket feed mechanism 30 and presented to the driver by way of chute 6 (FIG. 4). As an incident to the dispensing operation, the ribbon feed mechanism 34 also advances a small length of ribbon between the ticket strip and printing heads to provide a clear impression of the marking indicia.

As noted earlier, the ratio of advancement of the hourly marking ring 88 and daily marker ring 87 is 20 to 1, that is the hourly ring 88 makes one revolution while the daily marker ring 87 is advanced through one radial segment 21, there being provided 20 segments (FIG. 1) imprinted upon the ticket. This rate of advancement is constant and is provided by the gear trains 102 and 103 shown in FIG. 9, which are driven by the synchronous motor 91. The date and time of arrival, as recorded by the counter 90 (FIG. 5) is also advanced at the proper rate by the synchronous motor 91 and gear train 102 so as to show the correct date and time of arrival, as indicated at 12 in FIG. 1.

The ticket feeding and severing apparatus is omitted from the OUT-clock 2 since the cashier inserts the same card, with the severed trailing edge 55 first into the chute 20. This edge engages the trip lever 161 (FIG. 8) to initiate the printing cycle, which is carried out by similar solenoid-operated printing devices 140. As noted earlier, the trip lever 161 initiates the control cycle to cause operation of the printing devices 140—140 and also to advance the ribbon feed mechanism 34 as previously noted. AFter the ticket is printed by the time-recording mechanism of the OUT-clock 2 the parking fee is paid to the cashier as indicated on the daily and hourly calibrated time circles (FIGS. 2 or 3).

It will be understood that the hourly charge marker ring 155 and the daily charge marker ring 157 (FIG. 6) are advanced at the same rate as the hourly rate circle 88 and daily rate circle 87 (FIG. 5) since the marker rings 155 and 157 are advanced by a similar synchronous motor 91 and similar gear trains 102 and 103. It will also be understood that the date counter 154 (FIG. 6) for printing the departure date 16 as shown in FIGS. 2 and 3 is also advanced at the same rate as the date counter 90 of the IN clock.

As noted earlier, the date and time-recording mechanism is identical for both the IN and OUT clocks except that the OUT-date counter 154 is displaced inwardly with reference to the IN date computer 90 so as to imprint the OUT date and time 16 above the IN date and time 12 (FIGS. 2 and 3).

Since the time recorders of the IN clock and OUT clock both operate in synchronism, the indicator lines 156 and 160 of the OUT-marker rings 155 and 157 occupy an angular position corresponding to the zero position of the daily and hourly rate marker rings 67 and 68 at the time the rate circles 10 and 11 and the date and time 12 is printed (FIG. 1). By way of example, if the printed ticket shown in FIG. 1 were to be immediately inserted into the OUT clock, the indicator marks 14 and 15 would both coincide with the zero lines 21A and 27A of the rate cards; hence, there would be no charge under these conditions.

However, since the rate rings 155 and 157 continue advancing after the ticket is stamped, then at a later date, when the ticket 7 is stamped by the OUT recording mechanism the charge indicator lines 156 and 160 of the charge marker rings 155 and 157 will have advanced a distance corresponding to the elapsed time as shown in FIGS. 2 and 3. Thus, when the daily rate indicator line 14 (FIG. 2) falls almost directly upon the calibration line 21 indicating a charge of $8.75, either $7.50 or the correct amount can be verified by noting the position of the hourly indicator line 15 with reference to the zero indicator line 27A of the hourly rate circle (FIG. 2). Thus in this case, since the indicator 15 falls within the $1.25 circle, the elapsed time has not entered the 7th day and hence the charge is $7.50. This charge can be further verified by the date indications 16, which indicate that the seventh day of parking will not begin until the arrival time 8:38 p.m. is passed. As can be seen, the departure time of 8:33 p.m. indicates an elapsed time which is 5 minutes less than a full day.

As shown by way of contrast in FIG. 3, the daily charge indicator line 14 is still very close to the radial index line which indicates a charge of either $7.50 or $8.75. However, in this case, the hourly indicator line 15 has moved to a point just beyond the zero line 27A, thus indicating to the cashier that the parking fee is $8.75 as contrasted to a $7.50 charge when the line 15 had not reached the line 27A. The additional charge is corroborated by the departure time indication of 8:43 p.m. amounting to 5 minutes greater than a 24-hour period which began at 8:38 p.m. and justifying the charge because the parking patron had entered the next 24-hour period.

In the event that the vehicle is parked for a period exceeding 20 days, as provided by the 20-day rate circle, then the arrival date and time as indicated at 12 is compared with the departure date and time 16. In this case the cashier computes the total number of days by arithmetic using the IN-date 12 and the OUT-date 16 and having calculated the total number of days he will multiply this number with the daily rate factor, which in the illustrated embodiment is $1.25.

Having described my invention, I claim:

1. A time-recording apparatus for vehicle parking areas arranged to record arrival and departure time of the vehicle and for printing upon a blank ticket a record of elapsed time comprising:

an IN recorder having a pair of rotatable annular printing rings, said rings having indicia for printing upon a ticket a pair of arrival time circles, said annular printing rings being spaced apart from one another and arranged to print said circles including calibration marks dividing the circles into segments indicating the arrival time in integral days and fractional days respectively;

said IN recorder having power means for advancing the annular printing rings at coordinated rates, whereby the printing ring for the fractional day prints a vernier indication in relation to the annular ring which prints the integral day indication;

solenoid power means connected to said rotatable printing rings of the IN recorder for shifting said rings from an inactive position to a position in which the indicia thereon is printed upon a blank ticket:

a ticket feed and severing mechanism for feeding blank tickets to the arrival printing rings in response to the arrival of the vehicle and for severing and dispensing the printed ticket;

an OUT recorder having a pair of rotatable printing rings having indicia thereon arranged to print upon the ticket the departure time respectively in registry with the spaced pair of arrival time circles previously printed upon the ticket by the arrival time printing rings in integral days and fractional days, said departure time being printed in registry with the calibration marks of the arrival time circles;

said OUT recorder having power means for advancing the said pair of departure time printing rings at coordinated rates, whereby the printing ring which prints the fractional day departure time provides a vernier indication in relation to the printing ring which prints the integral day departure time;

solenoid power means connected to said rotatable rings of the OUT recorder for shifting said rings from an inactive position to a position in which the indicia thereon is printed upon a blank ticket;

whereby, the rotatable rings of the OUT recorder, in combination with the rotatable rings of the IN recorder provide a direct reading upon the ticket of the elapsed time.

2. A time-recording apparatus as set forth in claim 1 in which the indicia of the rotatable annular printing rings of the IN recorder include indicia for printing upon a ticket the arrival time in integral days and fractional days, and a zero mark in the fractional hour circle, whereby the annular printing rings which print the fractional days provides a vernier indication of the arrival time in relation to the printing rings which print the integral days, said OUT recorder including printing rings arranged to print in registry with the previously printed arrival time circles a delineation of the departure time in integral days and fractional days, said departure printing rings being arranged to print a mark either upstream or downstream from the said zero mark and indicating, by its location, a vernier indication of the integral days in terms of plus or minus 1 day, thereby providing a direct reading of the elapsed time.

3. A time-recording apparatus as set forth in claim 1 in which the pair of printing rings include indicia thereon for printing the circles and the calibration marks upon a ticket to show the arrival time in integral days and fractional days, and a zero mark in the fractional day circle, whereby the ring which prints the fractional days provides a vernier indication of the arrival time in relation to the ring which prints the integral days, said pair of annular rings of the OUT recorder having indicia arranged to print in registry with the previously printed arrival time circles a delineation of the departure time in integral days, and fractional days, said departure indicia of fractional days being located relative to the zero mark previously printed by the IN recorder either upstream or downstream therefrom and indicating, by its location, a vernier indication of the integral days in terms of plus or minus 1 day, thereby providing a direct reading of the elapsed time.

4. A time-recording apparatus as set forth in claim 1 in which the pair of rotatable annular printing rings, arranged to delineate the circles and the calibration marks upon a ticket to show the arrival time in integral days, fractional days include a zero calibration mark, the printing ring which delineates the fractional days providing a vernier indication of the arrival time in relation to the annular ring which delineates the integral days, the annular printing rings of said OUT recorder having indicia arranged to mark in registry with the previously delineated arrival time circle a delineation of the elapsed time in integral days and fractional days in registry with the calibration marks of the integral day circle and fractional day circle, and respective printing rings associated with said IN recorder and OUT recorder, the printing rings of the IN recorder printing the arrival time automatically in accordance with the angular relationship of the annular rings of the IN recorder, the printing device of the OUT recorder printing upon the ticket calibration marks in registry with the calibration marks of the IN recorder, said OUT recorder indicia being located relative to the zero calibration mark of the IN recorder either upstream or downstream therefrom indicating, by its location, a vernier indication of the integral days in terms of plus or minus 1 day, thereby providing a direct reading of the elapsed time.

5. A time-recording apparatus as set forth in claim 1 in which the pair of rotatable annular rings of the IN recorder includes raised indicia thereon for delineating the circles and the calibration marks upon a ticket to show the arrival time in integral days, fractional days and a zero calibration mark in the integral day circle, the ring which delineates the fractional days providing a vernier indication of the arrival time in relation to the annular ring which delineates the integral days, said OUT recorder including a pair of annular rings having raised indicia arranged to mark in registry with the previously delineated arrival time circles a delineation of the elapsed time in integral days and fractional days in registry with the calibration marks of the integral day circle and fractional day circles printed by the IN recorder, said OUT recorder indicia being located relative to the zero calibration mark of the IN recorder either upstream or downstream, therefrom and indicating, by its location, a vernier indication of the integral days in terms of plus or minus 1 day, thereby providing a direct reading of the elapsed time.

6. A time-recording apparatus as set forth in claim 1 for recording the arrival time of a vehicle in which the IN recorder is provided with a ticket-feeding mechanism, and a ticket-dispensing means, said ticket-feeding mechanism arranged to feed a strip of blank tickets toward said dispensing means, said rotatable annular rings of the IN clock impressing upon the strip the indication of the arrival time in days and fractional days as provided by the rotatable annular rings, said IN recorder having solenoid-operated power means for initiating operation of the rotatable printing rings upon arrival of a vehicle, the feeding mechanism having means for thereafter advancing the printed strip of tickets to the dispensing means, said feeding mechanism including cutoff mechanism for severing the printed portion of the ticket strip at the said dispensing means, said cutoff mechanism comprising a cutoff lever having one end pivotally mounted in the IN recorder and having an opposite swinging end, a shearing blade secured to the swinging end of the cutoff lever, and a solenoid connected to the swinging end of the cutoff lever for actuating the lever after a ticket has been printed by said annular printing rings.

7. A time-recording apparatus as set forth in claim 1 in which the "in" recorder is provided with a pair of rotatable annular rings, one of said rings constituting an integral day ring and the second ring constituting a fractional day ring, the integral day ring having arrival indicia thereon for delineating 20 calibration marks indicating one integral day each, the indicia of the fractional day ring delineating calibration marks indicating fractions of a day, the means for advancing the said annular rings advancing the fractional day ring at a 20 to 1 ratio in relation to the integral day ring, whereby the fractional day ring provides a vernier indication of arrival time in relation to the integral day ring.

8. A time-recording apparatus as set forth in claim 1 in which the rotatable annular printing rings of the OUT recorder have raised indicia thereon for delineating the departure time, said OUT recorder having solenoid-operated printing devices for impressing the indicia of said annular rings upon the ticket, and a control circuit for operating the printing devices through a printing cycle, said OUT recorder having ticket guide means for receiving a ticket previously printed by the IN recorder, said OUT recorder including switch means engageable by the ticket upon insertion thereof into the ticket guide means, said switch means interconnected with the control circuit, said switch means aligning the ticket with the arrival time circles and initiating a printing cycle whereby the solenoid-operated printing devices are operated in response to the insertion of the ticket within the ticket guide means of the OUT recorder to print the departure time in registry with the calibrations of the time circles.

* * * * *